(12) United States Patent
Moerland et al.

(10) Patent No.: US 11,643,233 B2
(45) Date of Patent: May 9, 2023

(54) SYSTEM FOR TRANSPORTING AND DELIVERING PIECE GOODS

(71) Applicant: MDE Automation B.V., Tholen (NL)

(72) Inventors: Pieter Marinus Anthonie Moerland, Tholen (NL); Jan Jacob Hoogesteger, Tholen (NL)

(73) Assignee: MDE Automation B.V., Tholen (NL)

( * ) Notice: Subject to any disclaimer, the term of this patent is extended or adjusted under 35 U.S.C. 154(b) by 174 days.

(21) Appl. No.: 17/174,560

(22) Filed: Feb. 12, 2021

(65) Prior Publication Data

US 2021/0245907 A1    Aug. 12, 2021

(30) Foreign Application Priority Data

Feb. 12, 2020 (NL) ..................................... 2024890

(51) Int. Cl.
*B65B 35/24* (2006.01)
*B65B 5/10* (2006.01)
(Continued)

(52) U.S. Cl.
CPC ............ *B65B 35/246* (2013.01); *B65B 5/101* (2013.01); *B65B 57/14* (2013.01); *B65G 43/08* (2013.01);
(Continued)

(58) Field of Classification Search
CPC .................................................. B65B 35/246
(Continued)

(56) References Cited

U.S. PATENT DOCUMENTS

| | | | |
|---|---|---|---|
| 3,106,280 A | 10/1963 | Baker | |
| 3,324,987 A * | 6/1967 | Kiesser | B65G 21/14 198/434 |
| 4,781,011 A * | 11/1988 | Prakken | B65B 5/101 53/538 |
| 5,088,912 A | 2/1992 | Raque | |
| 5,123,231 A * | 6/1992 | Fallas | B65G 47/31 53/538 |

(Continued)

FOREIGN PATENT DOCUMENTS

| | | | |
|---|---|---|---|
| DE | 10201182 A1 * | 7/2003 | ............. B65B 5/101 |
| DE | 102012008128 A1 * | 10/2013 | ........... B65B 35/246 |

(Continued)

*Primary Examiner* — Joseph A Dillon, Jr.
(74) *Attorney, Agent, or Firm* — The Dobrusin Law Firm, PC

(57) ABSTRACT

A system for transporting and depositing of piece goods, in particular detergent pods, comprising at least one transport conveyor with a transporting surface, for transporting of piece goods in a transport direction with a transport speed from a receiving location to a downstream located deposit station, said deposit station, for the receiving of the piece goods, provided with at least one area for receiving the piece goods, which area at least partly locates under the transport surface of the transport conveyor and extends under a receiving length in the transport direction of the transport conveyor, wherein a deposit location, where the transport conveyor deposits the piece goods in the area in the deposit station, is adjustable over the receiving length, a detector, for outputting a signal that indicates if at a certain moment piece goods can be deposited in the deposit station, wherein a controller for determining the deposit location depending on the detection signal, wherein the controller moves the deposit location upstream or remains at the same position when the detection signal indicates that piece goods can be received and wherein the controller moves the deposit location downstream when the detection signal indicates that (Continued)

piece goods cannot be received and wherein the at least one transport conveyor is provided with a fast-retracting nose bar, for setting the deposit location over the receiving length; and wherein the deposit station comprises a guide, in the shape of a funnel, which forms a through channel that has a receiving opening on one side which opening extends over at least the receiving length.

15 Claims, 4 Drawing Sheets

(51) Int. Cl.
    *B65B 57/14*        (2006.01)
    *B65G 43/08*        (2006.01)
    *B65G 47/71*        (2006.01)

(52) U.S. Cl.
    CPC ........ *B65G 47/71* (2013.01); *B65G 2201/027* (2013.01); *B65G 2203/0241* (2013.01)

(58) Field of Classification Search
    USPC ..................................................... 198/460.2
    See application file for complete search history.

(56) References Cited

U.S. PATENT DOCUMENTS

| | | | |
|---|---|---|---|
| 6,974,299 B2 * | 12/2005 | Prakken | B65G 47/766 |
| | | | 198/452 |
| 7,156,220 B2 * | 1/2007 | Olson | B07C 3/008 |
| | | | 198/465.1 |
| 7,413,070 B2 | 8/2008 | Mayer | |
| 8,612,050 B2 * | 12/2013 | Lee | B65G 47/31 |
| | | | 700/226 |
| 10,254,742 B2 * | 4/2019 | Wedemeyer | G05B 19/404 |
| 10,618,747 B2 * | 4/2020 | Flammann | B65B 35/44 |
| 2006/0131131 A1 * | 6/2006 | Mayer | B65B 5/101 |
| | | | 198/431 |
| 2019/0077610 A1 | 3/2019 | Flammann | |
| 2019/0359359 A1 * | 11/2019 | Scalerandi | B65B 19/34 |

FOREIGN PATENT DOCUMENTS

| | | | | |
|---|---|---|---|---|
| EP | 2314511 A2 * | 4/2011 | | B65B 25/04 |
| FR | 2605592 A * | 4/1988 | | B65B 35/246 |
| JP | 2018 138463 A | 9/2018 | | |
| JP | 6873464 B2 * | 5/2021 | | |
| KR | 20210122928 A * | 10/2021 | | |

* cited by examiner

SYSTEM FOR TRANSPORTING AND DELIVERING PIECE GOODS

The present invention relates to a system for transporting and delivering piece goods. In particular the invention relates to a handling system for detergent pods, between their production location and their packaging location.

The market for detergent pods is growing, so the demand for faster production is increasing. The production of these pods is a continuous process, while the packaging of the pods is a batch process since customers like to buy their detergent in discrete boxes. In high speed processing of the pods it is a challenge to transition from the continuous production process to a discrete packaging process. Packaging machines require a discrete supply of products in batch sizes corresponding to the packaging size, while the production machines require a constant running rate. This lack of synergy between the continuous and discrete process causes inefficiencies in the total production and packaging of the detergent pods. The producer needs to choose to either optimize the packaging process or to optimize the production process. By choosing for optimizing the packaging process, the continuous production process needs to stop frequently. In general, it is very disadvantageous to stop a continuous process. This has a negative effect on the efficiency, costs and quality of the production. When the producer chooses to optimize the continuous process the outgoing flow of products needs to be stored until the batch process is ready to process them. This is also a costly process since it requires both time and space.

The present invention provides thereto a system for transporting and depositing of piece goods.

The present invention provides thereto a system according to claim 1.

The receiving length equals the length between the two most extreme deposit locations. The first extreme location, the beginning of the deposit length, is the deposit position where the piece goods had the shortest transport distance in the transport direction on the transport conveyor. The second extreme location is the end of the deposit length, a location such that the piece goods spent more time on the transport conveyor than if they would have been deposited at the first extreme deposit location. This way a first buffer is obtained.

The system makes it possible to have a smooth change over from a continuous to a batch process.

The detector quickly delivers a signal that indicates if it is possible to deposit pieces in the deposit station. This is advantageous because the signals help in increasing the efficiency of the system. A smooth transition from continuous to batch processing is only possible when the feedback for the availability of the deposit station is quickly delivered by the detector. Additional time for this transition is created by changing the deposit location over the receiving length by the controller cooperating with the transport conveyor. During batch processing the deposit location is as far upstream, closest to the point where the piece goods are coming from. Whereas during the time in between the batch processing the deposit location is as far downstream, lengthening the total length of transport of the piece goods on the transport conveyor. Because the pieces need to be transported over a longer length with the same velocity, the pieces spend an advantageous longer time on the transport conveyor in this position and thus creating a timeslot wherein no pieces are deposited to the batch processing deposit station.

The transport conveyor is provided with a fast-retracting nose bar, for setting the deposit location over the receiving length. The fast-retracting nose bar can make the transport distance in the transport direction shorter or longer by retracting or extending. Fast-retracting conveyor nose bars are normally used for quickly and precisely placing products at a location. However, according to the present invention, it is used as a buffer in between a continuous process and a batch process. To use the transport conveyor with fast-retracting nose bar is advantageous to create more time in a process for successive operations. Typically, this can save up to 3 seconds of additional time that can be used for switching from one batch to another in the downstream process. Thus, creating a buffer on the transport conveyor of piece goods, in particular pods, in between the production and the packaging. This saves costs and space and increases efficiency.

In an embodiment of the present invention the system may have multiple transport conveyors that are placed in parallel in the same horizontal plane, wherein for each transport conveyor the deposit location is individually adjustable. This is advantageous because this makes it possible to optimize the moment the transport conveyor deposits a piece in the deposit station. It may be the case that only one more piece is needed to get to the full batch size, so one transport conveyors can deposit a piece by setting the deposit location at the beginning of the deposit length and for the other transport conveyors the deposit location is changed to the other extreme position, thus creating a buffer for the pieces on the transport conveyors. To individually adjust the deposit locations of multiple conveyors is advantageous because it increases the flexibility of the system.

The deposit station according to the present invention comprises a guide, in the shape of a funnel, which forms a through channel that has an opening, forming a receiving opening, on one side which opening extends over at least the receiving length. It is beneficial when the deposit station comprises such guide, because this avoids pieces accidentally falling outside of the deposit station or falling in an undesired spot. The shape of the guide may be that of a funnel or something alike. The preferred shape is a funnel, because funnel would be a practical for a robust receiving and accurate placing of the pieces. At least one exchangeable receiving reservoirs may be placed under the guide to collect the piece goods.

The system according to the present invention with multiple transport conveyors may comprise multiple guides. It is beneficial to have multiple guides in the system, because this increases the flexibility, productivity and accuracy of the system. Each transport conveyor may deposit the piece goods via the guide into the deposit station.

The system according to the present invention with multiple transport conveyors may have one receiving opening of one guide which extends under at least two transport conveyors, wherein at least two transport conveyors deposit piece goods in the same area. This configuration increases the speed of receiving by the area in the deposit location and thereby levelling the speed of the continuous process with the batch process as best as possible, ensuring a smooth operational process.

The system according to the present invention may be provided with at least one receiving reservoir, in this document called a puck, for receiving the piece goods in the deposit station, wherein each puck is transportable, preferably for receiving of an in the controller pre-set number of pieces. A receiving reservoir creates a separate collection of pieces, that are useful for the successive processing steps and wherein the pieces are protected from external influences. The pre-set number of pieces in the controller may for example be the packaging size or a particular part of a packaging size. It is useful to transport the pucks to use the pucks as a buffer for the pieces before the pods can be processed by the packaging machine.

In an embodiment of the present invention, the guide comprises a deposit opening which extends over a length shorter than the receiving length and wherein the size of the guide in the transport direction decreases in the direction from the receiving opening to the deposit opening. A deposit opening corresponding to or smaller than the size in the transport direction of the puck allows the system to operate at varying and/or higher speeds, because the guidance on the direction of the piece goods is higher. Preferably, the shape of the circumference of the deposit opening may correspond to the shape of the receiving opening of the at least one puck. This size and shape is advantageous because it enables the system to operate even more quickly and precise. The size of the guides in the transport direction may decrease substantially gradually from the wide receiving opening to the smaller deposit opening, wherein the deposit opening may comprise a substantially straight part to guide the direction of movement of the piece goods to the pucks. The smaller deposit opening avoids that piece goods will fall besides the receiving container, the puck, and thus frustrating the process. The deposit opening size in the transport direction or shape of its circumference may be smaller than the corresponding size in the transport direction of the at least one puck, wherein the piece goods are deposited, or smaller than the circumference of the receiving opening respectively. This is advantageous because it even further increases the preciseness of the deposit location.

The deposit opening of the guide may be centred over the receiving opening, such that each guide may have the same shape. In another embodiment, the deposit opening may be positioned off-centre more upward or downward in the transport direction. In this embodiment the location of the receiving opening of the guide is similar to the other guides, but due to the different relative positions of the deposit opening, the pieces goods are deposited in another puck.

In an embodiment of the system according to the present invention with multiple transport conveyors, the deposit locations may extend over at least adjacent intervals in the transport direction, preferably partly overlapping intervals in the transport direction. The deposit locations vary within the intervals, depending on the position of the fast retracting nosebar which depends on the need for a temporary buffer on the transport conveyor. The deposit location intervals may form a cascading pattern, preferably wherein the transport conveyors pairwise form a cascading pattern.

This embodiment is particularly suitable when the system needs to operate on a small floor footprint. Each area may comprise a puck, forming a receiving reservoir, such that each puck corresponds to at least one guide which receiving opening extends over at least the interval of deposit locations.

Further handling of the piece goods may be continued in a direction transverse to the transport direction, or in a direction oblique to the transport direction or in the same direction of the transport direction.

In an embodiment of the system according to the present invention with multiple transport conveyors, multiple deposit openings are located adjacent to each other in the direction transverse to the transport direction. The placement of the multiple deposit openings adjacent to each other enable the system to work accurate and precise. The deposit openings of the guides do not overlap in the direction transverse to the transport direction.

In an embodiment of the system according to the present invention comprising multiple transport conveyors, the multiple deposit locations of the multiple transport conveyors may vary over different locations in the transport direction In other words, the system comprises multiple transport conveyors, which are of different lengths, such that depositing locations vary over different intervals. This further optimizes the use of floor space of the system, such that also in small spaces the present invention can be operable.

In an embodiment of the system according to the present invention, the system is provided with at least one deposit conveyor for transporting the at least one puck in a direction different from the transport direction, preferably in a direction substantially perpendicular to the transport direction of the at least one transport conveyor. This embodiment also improves the footprint of the system by decreasing the requirement of floor space that is needed. It also provides more flexibility to further handling of the pucks.

In an embodiment of the present invention the detector is configured to indicate the remaining receiving capacity of the at least one puck. The remaining receiving capacity may be a value expressing the weight, amount or volume. It is likely that in case of multiple pucks each puck corresponds to a detector. This signal indicates the number of pieces that can be received by that specific puck. It is beneficial to indicate the remaining receiving capacity per puck because this increases the flexibility and accuracy of the system.

In an embodiment the detector may comprise a counter, wherein each counter counts the number of transported pieces per transport conveyor and wherein the controller determines the remaining fill capacity of the deposit station. By counting the pieces and feeding this information to the controller it is possible to link the count to the receiving capacity of the puck and determine when the puck comprises the pre-set number of pieces and needs to be exchanged. This is an easy and cost-effective way to determine when a puck has reached its capacity and needs to be exchanged. Each puck will have the same number of pieces regardless of minor deviations in weight or volume. The counter may for instance be comprising a photovoltaic sensor which output signals are used to count the number of pieces that went by.

The system according to the present invention may be provided with an exchanging mechanism for exchanging the pucks and wherein the controller is configured to exchange pucks wherein the receiving capacity reached a pre-set value, with pucks with full receiving capacity. In other words, full pucks are replaced by empty pucks. It is convenient to automatically exchange the pucks with the exchanging mechanism because this increases the speed of the exchange and thus increasing efficiency. The at least one transport conveyor may be placed above a row of exchangeable pucks, wherein the row of exchangeable pucks is positioned in the transport direction of said transport conveyor. Obviously, this configuration may be placed in parallel in the horizontal plane as well.

It is conceivable that the system according to the present invention is provided with a blocking mechanism for temporarily receiving piece goods, before the goods are received by the deposit station. The blocking mechanisms blocks the through channel of the guide temporarily to receive the pieces that were deposited while the pucks were exchanged. This blocking mechanism is beneficial because it creates an extra buffer for creating more time for the change over time between the batches, i.e. more time for exchanging the full pucks with empty pucks.

In an embodiment of the system according to the present invention, the system may be provided with multiple transport conveyors, wherein at least two transport conveyors deposit piece goods in the same area. This configuration increases the speed of receiving by the area in the deposit location and thereby levelling the speed of the continuous process with the batch process as best as possible, ensuring a smooth operational process. It is possible that in said area at least one puck is placed. In case a puck is positioned in the area, for example two transport conveyors may deposit pieces in the same puck, while the deposit location of each transport conveyor is individually adjustable.

Possibly the system according to the present invention is followed downstream by a buffer system comprising multiple parallel transport conveyors for holding a buffer of multiple pucks, wherein both empty pucks and full pucks are buffered. Each transport conveyor in the buffer system may comprise full pucks or empty pucks. The pucks can be buffered in the buffer system to ensure that the continuous process of production of pieces is not interrupted.

In an embodiment of the system according to the present invention a supplying conveyor is placed upstream for supplying piece goods, which supplying conveyor is provided with an inspection element for rejecting of approving the supplied rows of piece goods and provided with a rejection mechanism to dispose the rejected piece goods. This supplying conveyor may be the output conveyor of the last production machine element and thereby providing a link between the operational processes.

The system may also be provided with at least one positioning mechanism for ensuring that all piece goods are in a position within the dimensions of the at least one puck. This is beneficial when the pucks are also packaging that is used for selling the piece goods. In that case, the pucks may be provided with a lid to be stored and sold. To be able to place a lid properly without damaging the piece goods it is beneficial if the at least one positioning mechanism ensures that all piece goods in the puck are within the dimensions of the at least one puck. For example, the positioning mechanism may be a pushing mechanism or a shaking mechanism.

The invention according to the present invention will be illustrated by the following non-limitative exemplary figures, wherein.

Figure 1:
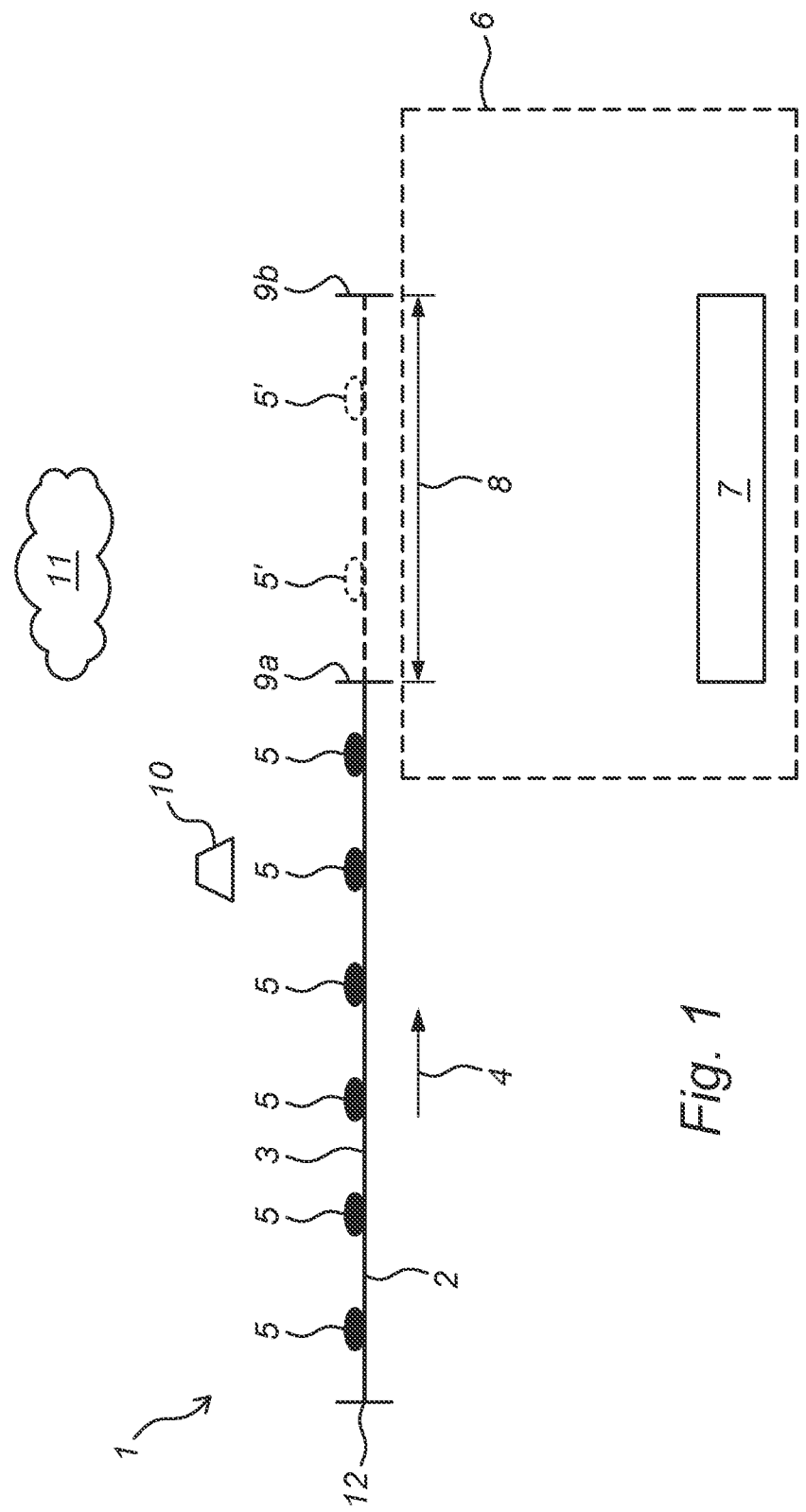
FIG. 1 shows a schematic side view of an embodiment of the system according to the present invention.

FIG. 1 shows a system 1 for transporting and depositing of piece goods comprising; at least one transport conveyor 2 with a transporting surface 3, for transporting of piece goods 5, 5' in a transport direction 4 with a transport speed from a receiving location 12 to a downstream located deposit station 6, said deposit station 6, for the receiving of the piece goods 5, provided with at least one area 7 for receiving the piece goods 5, which area at least partly locates under the transport surface 3 of the transport conveyor 2 and extends under a receiving length 8 in the transport direction 4 of the transport conveyor 2, wherein a deposit location between 9a and 9b, where the transport conveyor 2 deposits the piece goods 5 in the area 7 in the deposit station 6, is adjustable over the receiving length 8; a detector 10, for outputting a signal that indicates if at a certain moment piece goods can be deposited in the deposit station, and a controller 11 for determining the deposit location depending on the detection signal, wherein the controller moves the deposit location in the direction from 9b to 9a upstream towards 9a or remains at the same position when the detection signal indicates that piece goods can be received and wherein the controller moves the deposit location downstream in the direction from 9a to 9b when the detection signal indicates that piece goods cannot be received.

Figure 2:
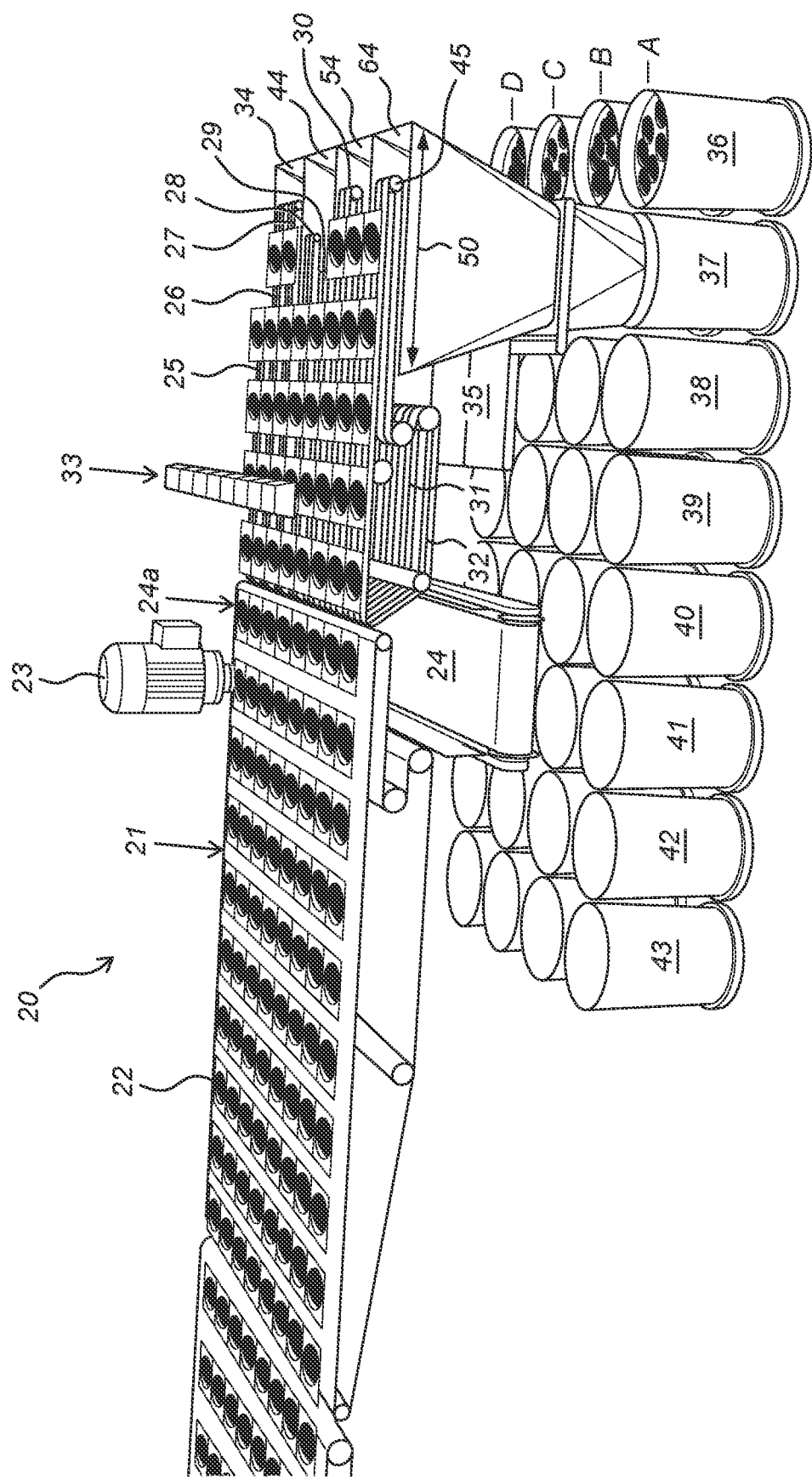
FIG. 2 shows a perspective view of an embodiment of the system according to the present invention with multiple transport conveyors.

FIG. 2 shows a system according to the present invention 20 with a supplying conveyor 21 supplying in parallel multiple rows of pods 22. Above the supplying conveyor 21 an inspection element 23 is placed. When the inspected row is rejected by the inspection element the row will be rejected and removed from the line by the additional conveyor 24, part of reject mechanism 24a. If the pods are approved, they will continue to the multiple transport conveyors 25-32, each provided with an individually adjustable deposit location over a guide in the form of a funnel. The guides 34,44,54,64 extend in transport direction over a receiving length 50 and in this example it is as wide to receive pods from two parallel transport conveyors.

A row of photovoltaic sensors 33 is placed above the transport conveyors 25-32, so that each photovoltaic sensor sends a signal to count the number of pods that are transported and thus deposited in the corresponding deposit area A-D.

The transport conveyors 25-32 deposit into four deposit areas A-D. The deposit location over the deposit length 50 is determined for each transport conveyor individually and can be set by using the fast-retractable nose bar 45.

Each guide is provided with a blocking mechanism 35 for temporarily providing an additional buffer for the pods when the receiving capacity of the puck below is reached and no puck with remaining receiving capacity is present below the guide.

Each deposit area A-D consists in transport direction of a row of pucks 36-43. In the figure the pucks 36 reached their receiving capacity and row 37 is being filled. The other rows with pucks 38-43 are empty and are waiting in line to be exchanged once the receiving capacity of row 37 is reached.

Figure 3:
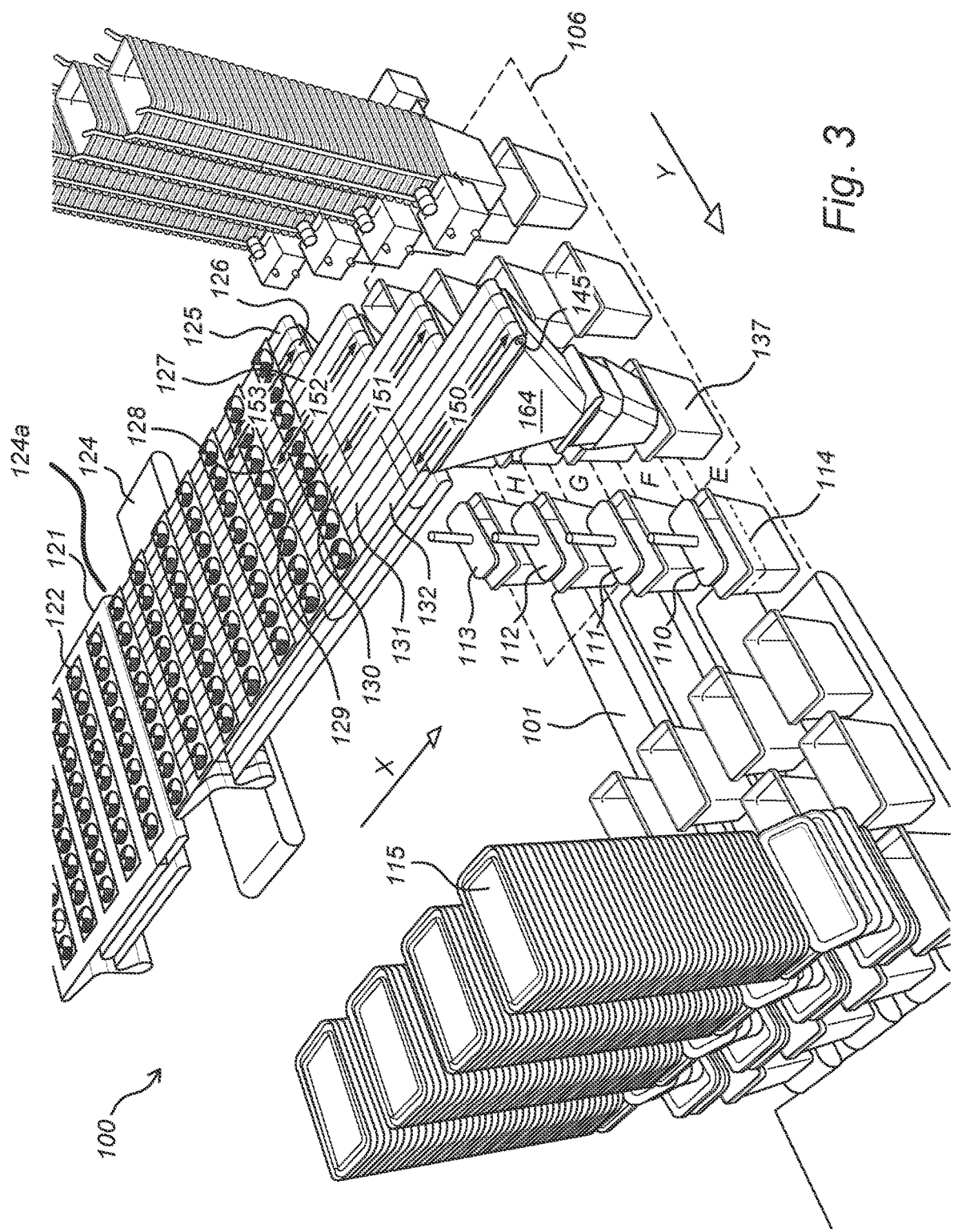
FIG. 3 shows a perspective view of an embodiment of the system according to the present invention wherein multiple deposit areas are located transverse to the transport direction of multiple transport conveyors.

FIG. 3 shows another embodiment according to the present invention 100. The figure shows a supplying conveyor 121 in parallel multiple rows of pods 121. The pods may be rejected and removed from the line by the additional conveyor 124, part of reject mechanism 124a. If the pods are approved they will continue to the transport conveyors 125-132. Each conveyor is provided with a fast-retractable nose bar 145. The multiple transport conveyors 125-132 are of different length, wherein pairwise the conveyors are of the same length and the end of the pairs of conveyors make a cascading pattern. The multiple transport conveyors pairwise form a cascade of deposit location intervals. The deposit location of each transport conveyor may be set over their respective receiving length 150-153. The deposit location of transport conveyors 132 and 131 is set by the fast retractable nosebar 145 over the receiving length 151, the deposit locations of conveyors 129, 130 over length 151, conveyors, the deposit locations of conveyors 127,128 over length 152 and the deposit locations of conveyors 125 and 26 over receiving length 153. The depositing locations vary over overlapping intervals, which intervals are defined by the positions of the receiving lengths 150-153. The intervals extend over at least the width in transport direction X of the deposit station 106. In this embodiment each pair of transport conveyors is provided with one guide. Below the transport conveyors 132,131 a guide 164 is present to guide the pods 122 from transport conveyors 131,132 into the puck 137 in deposit area E.

The deposit station 106 of the shown embodiment comprises multiple deposit areas E,F,G,H, such that the areas E-H are located adjacent to each other in the direction Y, transverse to the transport direction X and wherein the respective deposit locations vary within adjacent intervals 150,151,152,153 in the transport direction X.

The empty pucks are fed to the system and transported by a walking floor transport mechanism 101 in the direction substantially perpendicular to the transport direction X of the transport conveyor 121. After the pucks are filled with a predetermined amount of pods 122, the pucks are transported to the positioning mechanisms, which comprise pushing means 110-113, which ensures that the pods are within the dimensions of the pucks and that the pucks are not filled above a predetermined invisible or visible fill capacity line 114, so that the pucks further downstream can be provided with a lid 115.

Figure 4:
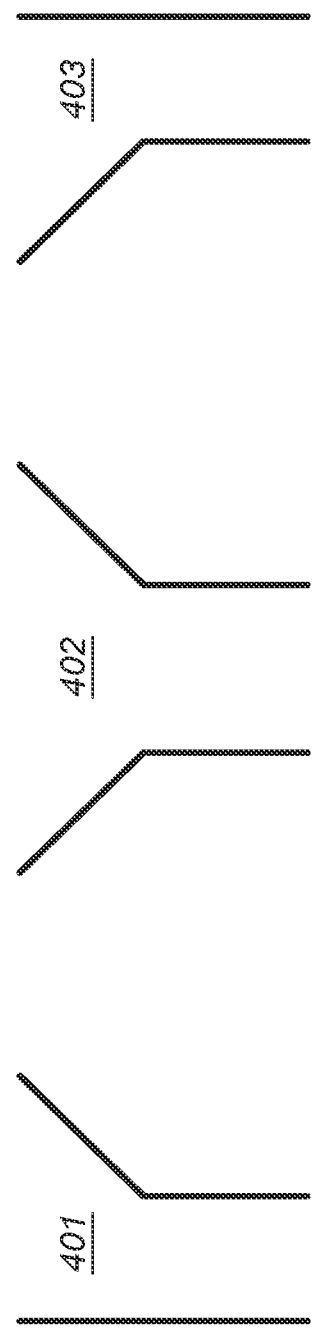
FIG. 4 shows examples of suitable funnels to be used in the system according to the present invention.

FIG. 4 shows examples of suitable funnels 401,402,403 to be used in the system according to the present invention. The funnels may be used to guide piece goods from the transporting conveyor to the desired area in the deposit station. Depending on the width of the receiving opening of the funnel and configuration of the deposit station, any of the funnels 401,402,403 may be chosen.

The invention claimed is:

1. A system for transporting and depositing of piece goods, comprising;
    at least one transport conveyor with a transporting surface, for transporting of piece goods in a transport direction with a transport speed from a receiving location to a downstream located deposit station,
    said deposit station, for the receiving of the piece goods, provided with at least one area for receiving the piece goods, which area at least partly locates under the transport surface of the transport conveyor and extends under a receiving length in the transport direction of the transport conveyor, wherein
        a deposit location, where the transport conveyor deposits the piece goods in the area in the deposit station, is adjustable over the receiving length;
    a detector, for outputting a signal that indicates if at a certain moment piece goods can be deposited in the deposit station,
characterised by
    a controller for determining the deposit location depending on the detection signal, wherein the controller moves the deposit location upstream or remains at the same position when the detection signal indicates that piece goods can be received and wherein the controller moves the deposit location downstream when the detection signal indicates that piece goods cannot be received; and wherein
    the at least one transport conveyor is provided with a fast-retracting nose bar, for setting the deposit location over the receiving length; and wherein
    the deposit station comprises a guide, in the shape of a funnel, which forms a through channel that has a receiving opening on one side which opening extends over at least the receiving length.

2. System according to claim 1, wherein multiple transport conveyors are placed in parallel in the same horizontal plane, wherein for each transport conveyor the deposit location is individually adjustable.

3. System according to claim 2, comprising multiple guides.

4. System according to claim 2, wherein one receiving opening of one guide extends under at least two transport conveyors, wherein at least two transport conveyors deposit piece goods in the same area.

5. System according to claim 1, provided with at least one puck, forming a receiving reservoir, for receiving the piece goods in the deposit station, wherein each puck is transportable.

6. System according to claim 1, wherein the guide comprises a deposit opening which extends over a length shorter than the receiving length and wherein the size of the guide in the transport direction decreases in the direction from the receiving opening to the deposit opening.

7. System according to claim 1, wherein the deposit locations extend over at least adjacent intervals in the transport direction.

8. System according to claim 1, wherein multiple deposit openings are located adjacent to each other in the direction transverse to the transport direction.

9. System according to claim 1, wherein the multiple depositing locations of the multiple transport conveyors vary over different locations in the transport direction.

10. System according to claim 5, wherein the detector is configured to indicate the remaining receiving capacity of the at least one puck.

11. System according to claim 1, wherein the detector comprises a counter, wherein each counter counts the number of transported pieces per transport conveyor and wherein the controller determines the remaining fill capacity of the deposit station.

12. System according to claim 5, provided with an exchanging mechanism for exchanging the pucks and wherein the controller is configured to exchange pucks wherein the receiving capacity reached a pre-set value, with pucks with full receiving capacity.

13. System according to claim 1, wherein the guide is provided with a blocking mechanism for temporarily receiving piece goods, before the piece goods are received by the deposit station.

14. System according to claim 1, wherein upstream a supplying conveyor is placed for supplying piece goods, which supplying conveyor is provided with an inspection element for rejecting of approving the supplied rows of piece goods and provided with a rejection mechanism to dispose the rejected piece goods.

15. System according to claim 5, provided with at least one positioning mechanism for ensuring that all piece goods are in a position within the dimensions of the at least one puck.

* * * * *